United States Patent
Borgione et al.

(10) Patent No.: US 10,630,585 B2
(45) Date of Patent: Apr. 21, 2020

(54) METHOD AND SYSTEM FOR WITHDRAWING PROGRAMMED ROUTES IN NETWORK DEVICES

(71) Applicant: Arista Networks, Inc., Santa Clara, CA (US)

(72) Inventors: Sebastiano Borgione, Santa Clara, CA (US); Siva Narayanan, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 484 days.

(21) Appl. No.: 14/688,802

(22) Filed: Apr. 16, 2015

(65) Prior Publication Data

US 2016/0308767 A1    Oct. 20, 2016

(51) Int. Cl.
| | |
|---|---|
| *H04L 12/741* | (2013.01) |
| *H04L 12/757* | (2013.01) |
| *H04L 12/721* | (2013.01) |
| *H04L 12/26* | (2006.01) |

(52) U.S. Cl.
CPC .......... *H04L 45/745* (2013.01); *H04L 45/023* (2013.01); *H04L 45/566* (2013.01); *H04L 43/0829* (2013.01)

(58) Field of Classification Search
CPC .................................................... H04L 45/745
See application file for complete search history.

(56) References Cited

U.S. PATENT DOCUMENTS

| | | | | |
|---|---|---|---|---|
| 7,286,468 B2* | 10/2007 | Scudder | .................. | H04L 45/02 370/219 |
| 7,359,377 B1* | 4/2008 | Kompella | ............... | H04L 45/50 370/254 |
| 7,406,030 B1* | 7/2008 | Rijsman | .................. | H04L 45/00 370/216 |
| 7,447,225 B2* | 11/2008 | Windisch | ............ | H04L 12/1877 370/428 |

(Continued)

FOREIGN PATENT DOCUMENTS

| | | |
|---|---|---|
| EP | 2624632 A1 | 8/2013 |
| WO | 2013067377 A2 | 5/2013 |

OTHER PUBLICATIONS

International Search Report for PCT/US2016/027533, dated Jun. 14, 2016 (4 pages).

(Continued)

*Primary Examiner* — Gregory B Sefcheck
(74) *Attorney, Agent, or Firm* — Chamberlain, Hrdlicka, White, Williams & Aughtry

(57) ABSTRACT

A method for withdrawing programmed routes in network devices. The method includes receiving instructions to withdraw at least one route of a set of programmed routes, where the set of programmed routes is stored in a forwarding information base (FIB), removing the at least one route from a set of routes stored in a routing information base (RIB), notifying at least one peer network device of a set of peer network devices about the at least one route to be withdrawn, initializing a timer with a timeout value and starting the timer, before the time expires, processing a packet that uses the at least one route to be withdrawn, and after the timer expires, removing the at least one route from the FIB.

17 Claims, 5 Drawing Sheets

(56) References Cited

U.S. PATENT DOCUMENTS

| | | | | |
|---|---|---|---|---|
| 7,508,772 B1* | 3/2009 | Ward | ................ | H04L 45/02 370/254 |
| 7,633,874 B1* | 12/2009 | Nalawade | ................ | H04L 45/00 370/238 |
| 7,688,714 B2* | 3/2010 | Nalawade | ................ | H04L 45/02 370/217 |
| 7,710,899 B1* | 5/2010 | Ward | ................ | H04L 45/02 370/254 |
| 7,787,360 B2* | 8/2010 | Windisch | ................ | H04L 45/00 370/217 |
| 7,852,772 B2* | 12/2010 | Filsfils | ................ | H04L 45/00 370/238 |
| 7,936,754 B2* | 5/2011 | Napierala | ................ | H04L 45/00 370/328 |
| 7,940,649 B2* | 5/2011 | Kapoor | ................ | H04L 45/02 370/218 |
| 7,948,873 B2* | 5/2011 | Ward | ................ | H04L 45/04 370/219 |
| 8,141,156 B1* | 3/2012 | Mao | ................ | H04L 45/021 709/223 |
| 8,155,129 B2* | 4/2012 | Appanna | ................ | H04L 45/02 370/255 |
| 8,224,971 B1* | 7/2012 | Miller | ................ | H04L 12/66 370/254 |
| 8,254,383 B2* | 8/2012 | Nordmark | ................ | H04L 45/54 370/389 |
| 8,254,396 B2* | 8/2012 | Appanna | ................ | H04L 45/02 370/255 |
| 8,339,942 B2* | 12/2012 | Liu | ................ | H04L 45/00 370/218 |
| 8,379,513 B2* | 2/2013 | Ward | ................ | H04L 45/04 370/219 |
| 8,396,988 B2* | 3/2013 | Uttaro | ................ | H04L 41/0668 709/239 |
| 8,422,514 B1* | 4/2013 | Kothari | ................ | H04L 12/4633 370/351 |
| 8,572,225 B2* | 10/2013 | Scudder | ................ | H04L 45/02 709/223 |
| 8,667,174 B2* | 3/2014 | Uttaro | ................ | H04L 41/0668 706/12 |
| 8,806,032 B2* | 8/2014 | Van der Merwe | ................ | H04L 45/02 709/227 |
| 8,830,867 B2* | 9/2014 | Lu | ................ | H04L 45/023 370/254 |
| 8,861,345 B2* | 10/2014 | Hares | ................ | H04L 45/04 370/229 |
| 8,953,437 B1* | 2/2015 | Tiruveedhula | ................ | H04L 45/50 370/218 |
| 9,014,187 B2* | 4/2015 | Lu | ................ | H04L 45/02 370/392 |
| 9,118,541 B2* | 8/2015 | Swallow | ................ | H04L 45/02 |
| 9,178,797 B2* | 11/2015 | Scudder | ................ | H04L 45/021 |
| 9,225,590 B2* | 12/2015 | Zhang | ................ | H04L 41/0654 |
| 9,455,894 B1* | 9/2016 | Neelam | ................ | H04L 43/0888 |
| 9,461,908 B2* | 10/2016 | Wang | ................ | H04L 45/04 |
| 9,787,575 B2* | 10/2017 | Gattani | ................ | H04L 45/24 |
| 10,122,620 B2* | 11/2018 | Gattani | ................ | H04L 45/24 |
| 2004/0167988 A1* | 8/2004 | Rune | ................ | H04L 12/4616 709/238 |
| 2011/0134931 A1* | 6/2011 | Merwe | ................ | H04L 41/0816 370/401 |
| 2013/0021943 A1 | 1/2013 | Lu et al. | | |
| 2013/0191434 A1 | 7/2013 | Smith et al. | | |

OTHER PUBLICATIONS

Written Opinion for PCT/US2016/027533, dated Jun. 14, 2016 (8 pages).

Y. Rekhter, Ed., T. Li, Ed., S. Hares, Ed. "A Border Gateway Protocol 4 (BGP-4)" Network Sorking Group, Request for Comments: 4271, Obsoletes: 1771, https://tools.ietf.org/html/rfc4271. Jan. 2006, 104 pages.

* cited by examiner

METHOD AND SYSTEM FOR WITHDRAWING PROGRAMMED ROUTES IN NETWORK DEVICES

BACKGROUND

Network devices such as routers or multilayer switches are network devices that are used to manage the flow of data between different segments of a network. A network device may use routes programmed into the hardware of the network device to manage the flow of data. Routes may be withdrawn from the set of routes used by the network device to perform routing.

SUMMARY

In general, in one aspect, the invention relates to a method for withdrawing programmed routes in network devices. The method comprises receiving instructions to withdraw at least one route of a plurality of programmed routes, wherein the plurality of programmed routes is stored in a forwarding information base (FIB), removing the at least one route from a plurality of routes stored in a routing information base (RIB), notifying at least one peer network device of a plurality of peer network devices about the at least one route to be withdrawn, initializing a timer with a timeout value and starting the timer, before the time expires, processing a packet that uses the at least one route to be withdrawn, and after the timer expires, removing the at least one route from the FIB.

In general, in one aspect, the invention relates to a network device comprising a network device operating system (OS), wherein the network device receives instructions to withdraw at least one route of a plurality of programmed routes, wherein the plurality of programmed routes is stored in a forwarding info nation base (FIB), wherein the network device removes the at least one route from a plurality of routes stored in a routing information base (RIB), wherein the network device notifies at least one peer network device of a plurality of peer network devices about the at least one route to be withdrawn, wherein the network device initializes a timer with a timeout value and starts the timer, wherein, before the time expires, the network device processes a packet that uses the at least one route to be withdrawn, and wherein, after the timer expires, the network device removes the at least one route from the FIB.

In general, in one aspect, the invention relates to a non-transitory computer readable medium comprising instructions that enable a network device to receive instructions to withdraw at least one route of a plurality of programmed routes, wherein the plurality of programmed routes is stored in a forwarding information base (FIB), remove the at least one route from a plurality of routes stored in a routing information base (RIB), notify at least one peer network device of a plurality of peer network devices about the at least one route to be withdrawn, initialize a timer with a timeout value and start the timer, before the time expires, process a packet that uses the at least one route to be withdrawn, and after the timer expires, remove the at least one route from the FIB.

Other aspects of the invention will be apparent from the following description and the appended claims.

DETAILED DESCRIPTION

Figure 1:
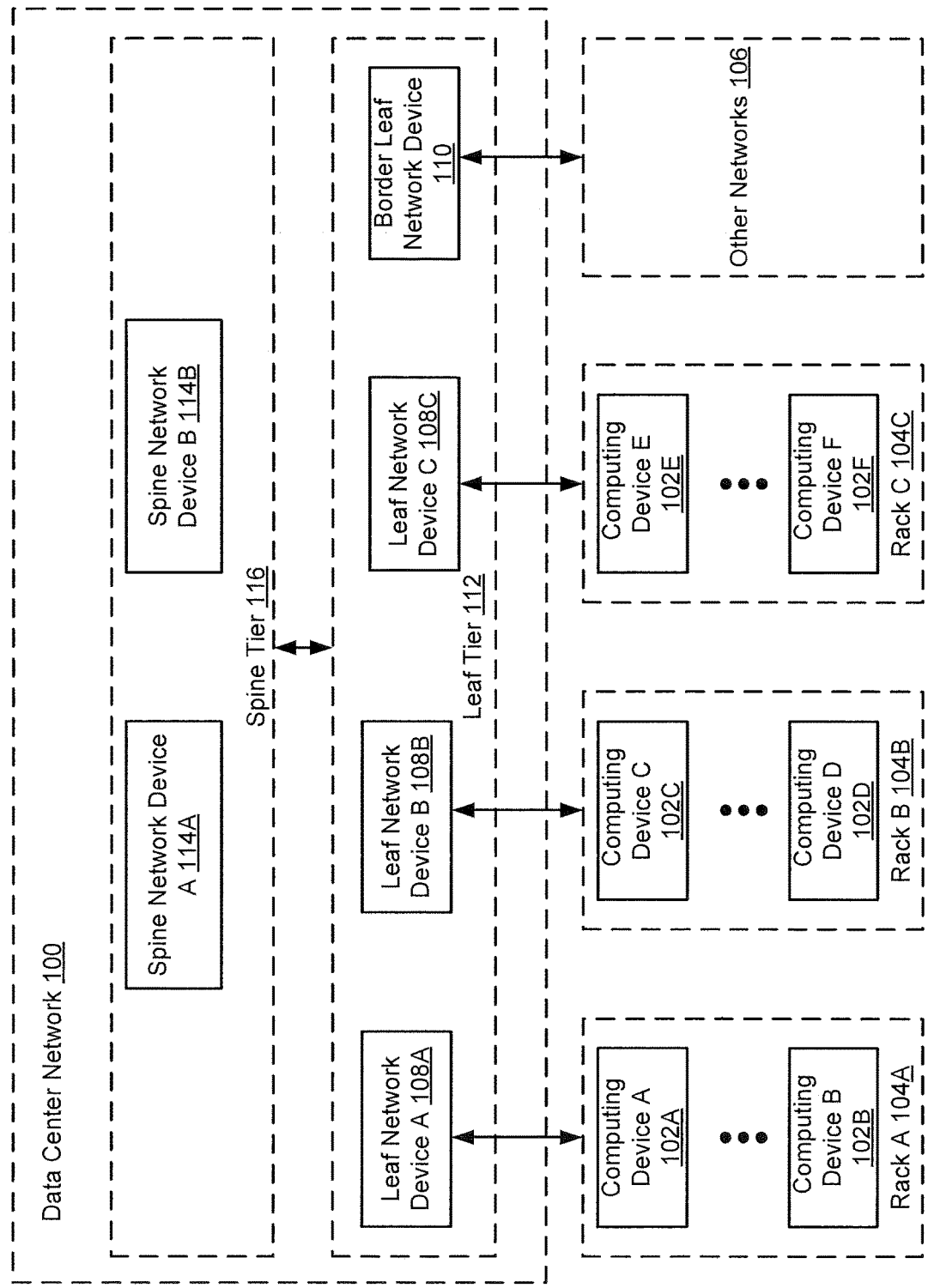
FIG. 1 shows a network including network devices in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to programming routes into the hardware of a network device. Routes may be programmed into the hardware of the network device in order to enable the network to direct packets, received from peer network devices, to the destinations of the packets. The network device may identify the destination of a received packet, search the routes programmed into the hardware of the network device for a suitable route to the destination, and direct the packet to the next hop network device of the route, i.e. the next network device in the chain of network devices forming the route to the destination. More specifically, one or more embodiments of the invention include withdrawal of routes that are programmed into the hardware of the network device.

In one or more embodiments of the invention, a network administrator may decide to withdraw one or more of the routes programmed into the hardware of the network device. A route may be withdrawn by removing the route from the set of routes programmed into the hardware of the network device. Reasons for withdrawing a route may include, for example, an update of the network's routing policies or scheduled maintenance of equipment that may affect availability, reliability of the route, etc.

In one or more embodiments of the invention, a route withdrawal may need to be communicated to the peer network devices in order to ensure that the peer network devices are aware of the non-availability of the route. A peer network device receiving the route withdrawal notification may stop directing packets, whose deliverability depends on the availability of the route to be withdrawn, to the network device. Depending on the number of peer network devices and the network topology, it may take a non-negligible amount of time until all peer network device have received the route withdrawal notification. Until a peer network device has received the notification, it may continue directing packets, whose deliverability depends on the availability of the route to be withdrawn, to the network device.

Generally, network devices may update the routes programmed into the hardware immediately after instructions for adding or removing a route have been received, in order to ensure that routing decisions are based on the most recent information about available routes. Accordingly, a network device may remove a route from the routes stored in the hardware of the network device as soon as the instructions to withdraw the route have been received. As previously described, there may be a non-negligible delay between the network device communicating the route withdrawal to peer network devices, and the peer network devices receiving the route withdrawal notification. Accordingly, there may be a time window during which the network device has already withdrawn the route from the routes programmed into the hardware of the network device, and during which a peer network device has not yet received the route withdrawal notification. During this time window, the peer network device may continue to direct packets, whose deliverability depends on the availability of the withdrawn route, to the network device. Because the network device has withdrawn the route from the routes programmed into the hardware of the network device, the network device may not be able to process these packets and may therefore be forced to drop the packets. A network device in accordance with one or more embodiments of the invention may therefore delay the withdrawal of a route from the routes programmed into the hardware of the network device until all peer network devices have been notified about the pending route withdrawal. The network device may thus continue to temporarily make routing decisions based on outdated routing information while it is communicating the pending route withdrawal to the peer network devices. In one or more embodiments of the invention, the network device may only withdraw the route from the routes programmed into the network device, once all peer network devices in the network have received the notification about the pending route withdrawal, and accordingly have stopped addressing packets requiring the route to be withdrawn to the network device. In a network that uses network devices in accordance with one or more embodiments of the invention, a route can therefore be withdrawn without causing dropped packets.

A network device in accordance with one or more embodiments of the invention may, however, immediately update the routes programmed into the hardware when instructions to add a new route are received. Accordingly, a network device in accordance with one or more embodiments of the invention may immediately offer routes that are added, and it may keep offering routes that are to be removed, for a limited time, thereby avoiding the possibility of dropped packets.

The following description describes some embodiments of the invention in which the network devices are routers. However, the invention is not limited to routers; rather embodiments of the invention may be extended to include other network devices (e.g. multi-layer switches, etc.).

FIG. 1 shows a network that includes network devices in accordance with one or more embodiments of the invention. In one embodiment of the invention, the network (100) may connect to computing devices (102A-102F) that may be housed in racks (104A-104C). The network (100) may be organized hierarchically. For example, a leaf tier (112) may include leaf network devices (108A-108C), and a spine tier (116) may include spine network devices (114A-114B). In addition, the network (100) may include a border leaf network device (110) that may connect the network (100) to other networks (106). Each of these components is described below.

In one or more embodiments of the invention, the network (100) includes a set of network devices (108A-108C, 110, 114A and 114B) that are configured to act in concert to provide a connection for exchange of data packets between the computing devices (102A-102F) and/or between the computing devices (102A-102F) and other computing devices outside of the network (not shown).

In one embodiment of the invention, the computing devices (102A-102F), housed in racks (104A-104C), may be servers. A server may include a processor, memory, and one or more physical network interfaces. Examples of types of servers include, but are not limited to, Dynamic Host Configuration Protocol (DHCP) servers, database servers, application servers, file servers, print servers, and mail servers. At least one network interface of a server connects the server to the network (100) via a leaf network device (108A-108C).

In one or more embodiments of the invention, the leaf network devices (108A-108C) are organized in the leaf tier (112). The leaf tier (112) forms an access layer with connections to the computing devices (102A-102F), and connections to the spine network devices (114A-114B) in the spine tier (116). The aforementioned connections enable packets to be communicated between computing devices (102A-102F) located in different racks (104A-104C), for example, between computing device A (102A) in rack A (104A) and computing device F (102F) in rack C (104C), via leaf network device A (108A), spine network device A (114A) or spine network device B (114B), and leaf network device C (108C). The border network device (110) organized in the leaf tier (112) may provide an interface to external networks (106), enabling, for example, access to the servers (102A-102F) from a workstation (not shown) located outside the network (100).

Figure 3:
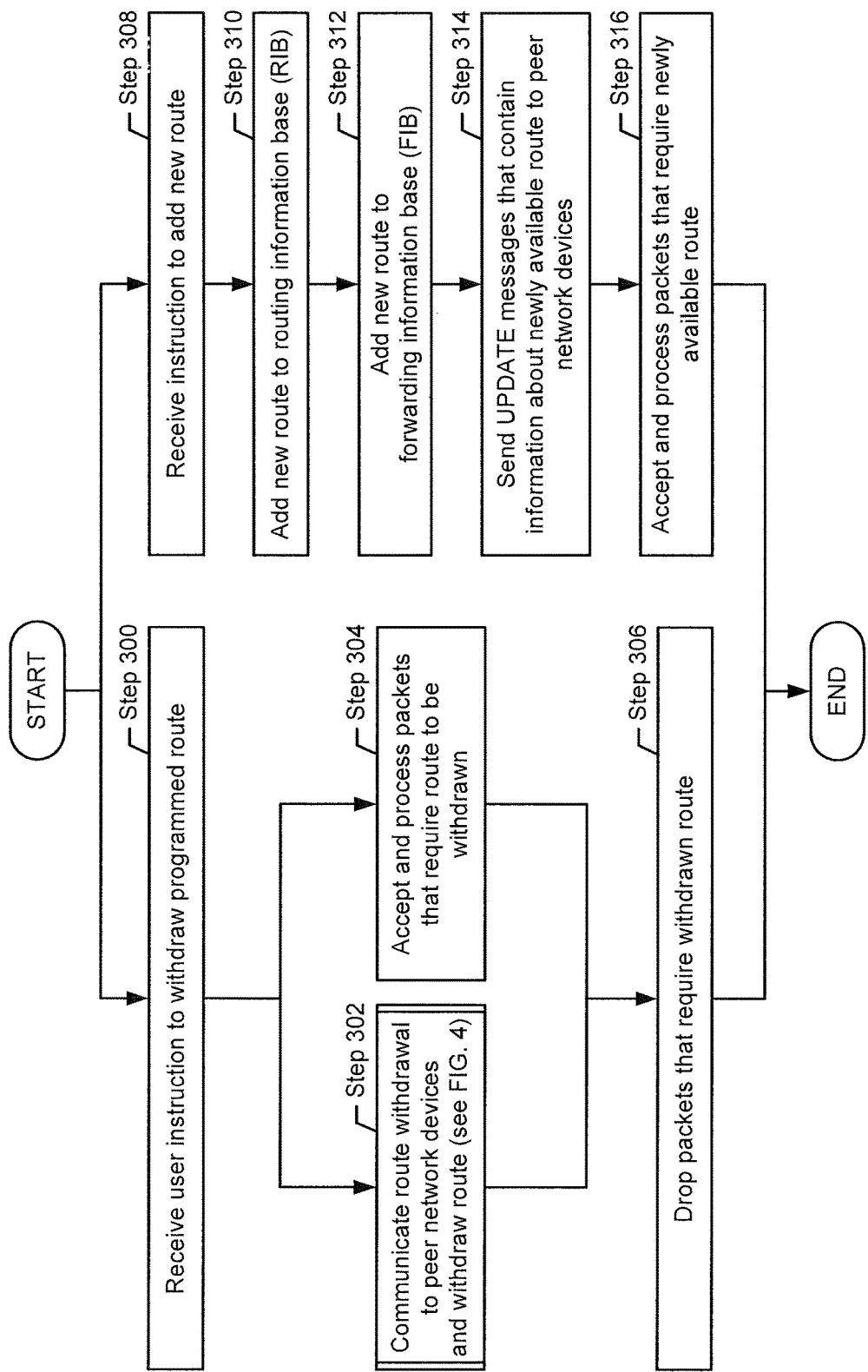
FIG. 3 shows a flowchart in accordance with one or more embodiments of the invention.
Figure 4:
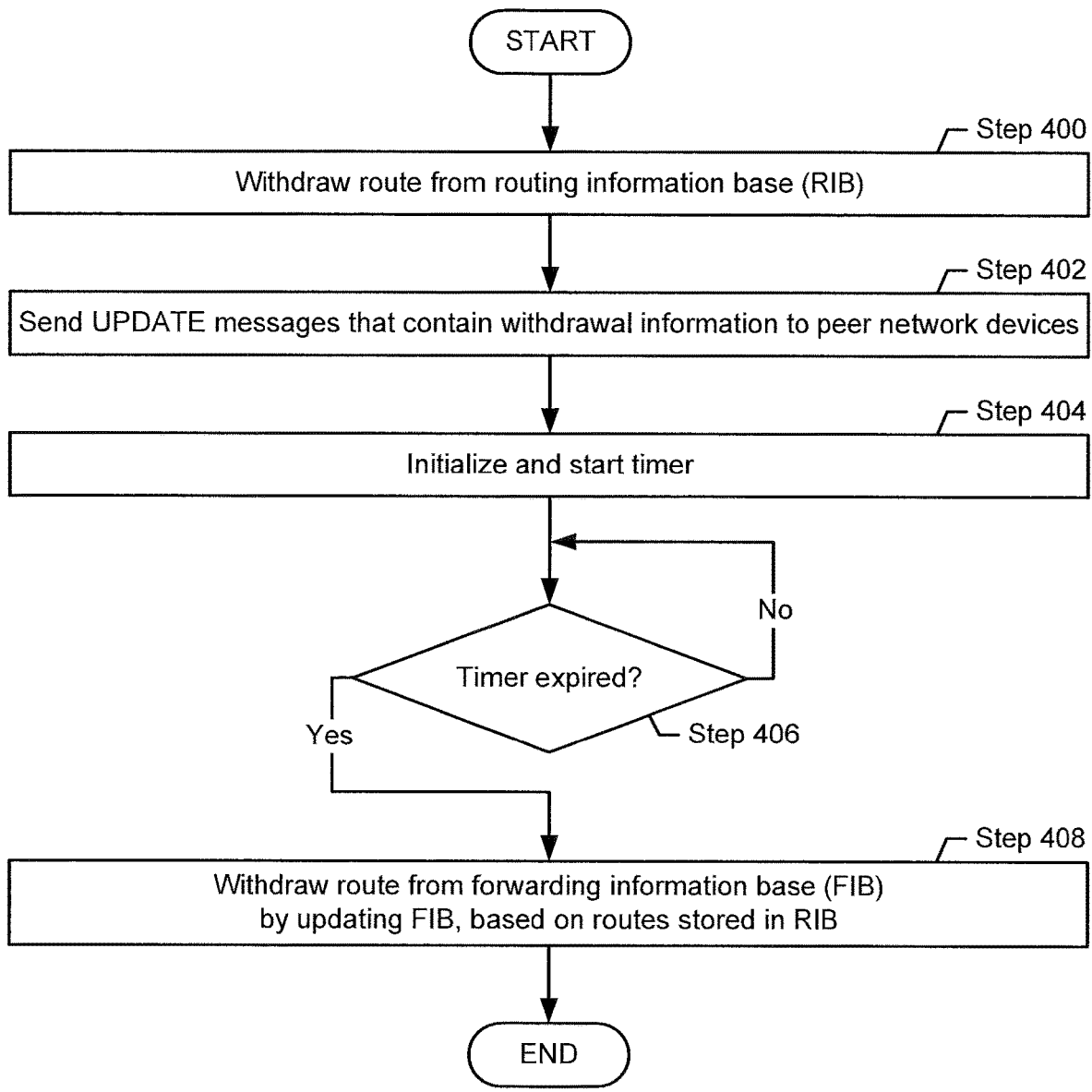
FIG. 4 shows a flowchart in accordance with one or more embodiments of the invention.

In one or more embodiments of the invention, the leaf network devices (108A-108C), the spine network devices (114A-114B), and the border leaf network device (110) may be, for example, routers or multi-layer switches configured to perform various switching functions (e.g., layer 2 functions) and routing functions, e.g., layer 3 functions and functions implemented in FIGS. 3 and 4.

Figure 2:
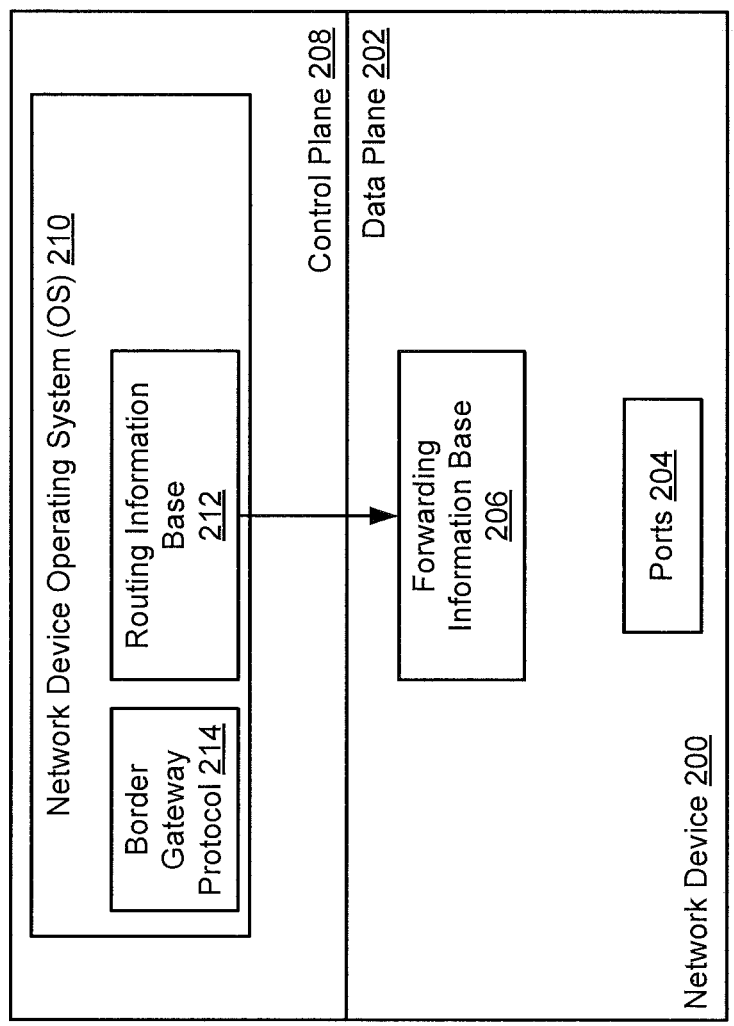
FIG. 2 shows a network device in accordance with one or more embodiments of the invention.

FIG. 2 shows a network device (200) in accordance with one or more embodiments of the invention. In one embodiment of the invention, the network device (200) may include ports (204), and a forwarding information base (FIB) (206), organized in a data plane (202). A network device in accordance with one or more embodiments of the invention may further include a network device operating system (OS) (210) in a control plane (208). The network device OS (210) is software that manages the hardware of the network device to provide functionality to the network device (e.g., functionality to implement methods shown in FIGS. 3-4) and may be executed on a processor (not shown). The network device OS (210) may host an implementation of the border gateway protocol (BGP) (214) and may implement a routing information base (RIB) (212). Each of these components is described below.

In one or more embodiments of the invention, the ports (204) of the network device (200) provide the physical interfaces to other network devices or computing devices (not shown). Incoming packets may be received by the network device (200) via the ports (204), and outgoing packets may be sent by the network device (200) via the ports (204). The network device is configured to process packets in accordance with one or more embodiments of the invention. The forwarding information base (FIB) (206) is a hardware-implemented database containing the route entries to be used by the network device for making routing decisions. In one or more embodiments of the invention, processing a packet may include receiving a packet via a port (204), extracting packet destination information from the packet header of the received packet, searching the FIB (206) for a suitable route to the destination, and sending the packet, via a port (204), to the next hop network device, i.e. the next network device in the chain of network devices forming the route to the destination.

In one or more embodiments of the invention, the route entries in the FIB (206) may be programmed by the network device OS (210), based on route entries stored in the routing information base (RIB) (212). The network device OS (210) may use the RIB (212) for storing all available routing information Routing protocols such as, for example, the border gateway protocol (BGP) may store routes received from a peer network device via a route update in the RIB (212). A route may be removed from the RIB (212) if instructions to remove the route are received from a peer network device or from an administrator of the network device. The network device OS (210) may select a set of routes to be used for routing from the routes stored in the RIB, and may write the selected routes to the FIB (206). A complete set of routes may be written to the FIB (206) during network device initialization, for example, after powering on the network device. Further, the FIB (206) may be updated periodically by writing or deleting complete sets of routes, individual route entries, or groups of routes while the network device is operating.

In one or more embodiments of the invention, the RIB (212) is populated with routes preprogrammed into the network device (200), complemented by routes received from peer network devices (not shown). The network device (200) may receive routes from peer network devices by exchanging route updates with the peer network devices using, for example, the border gateway protocol (BGP) (214), or other protocols suitable for exchanging routing and reachability information.

One skilled in the art will recognize that the architecture of a network device is not limited to the components shown in FIG. 2. For example, the network device may include network chips, processors and memory not shown in FIG. 2.

FIGS. 3-4 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3-4 may be performed in parallel with any other steps shown in FIGS. 3-4 without departing from the invention.

FIG. 3 shows a method for adding new routes and for withdrawing programmed routes in network devices. The steps shown in FIG. 3 may be performed by a network device operating system (OS). The method includes two separate branches for withdrawing routes (Steps 300-306), and for adding new routes (Steps 308-316), that may be executed in parallel.

Turning to FIG. 3, steps 300-306 describe a method, in accordance with one or more embodiments of the invention, for the withdrawal of programmed routes in a network device. In Step 300, the network device receives instructions to withdraw a route or multiple routes from the set of routes programmed into the hardware of the forwarding information base (FIB). The instructions to withdraw routes may be provided by a network administrator. The network administrator may, for example, decide to withdraw a route because equipment that may affect the availability of the route is scheduled to become unavailable.

In Step 302, the network device notifies the peer network devices about the pending withdrawal of the route and subsequently withdraws the route. The details of Step 302 are described in FIG. 4.

In Step 304, a packet that requires a route that is scheduled to be withdrawn is processed normally, i.e. the packet is delivered to the packet's destination using the route to be withdrawn. In addition, packets that require other routes (i.e. routes that are not scheduled to be withdrawn) are processed normally. Step 304 is executed concurrently with Step 302 for the entire duration of the execution of Step 302.

In Step 306, a packet that requires a route that has been withdrawn in Step 302 cannot be processed and is therefore dropped. However, if all peer network devices have been successfully notified about the pending route withdrawal in Step 302, no packets that require the withdrawn route are addressed to the network device, and accordingly no packets should be dropped. In addition, packets that require other routes (i.e. routes that are not scheduled to be withdrawn) are processed normally.

Steps 308-316 describe a method, in accordance with one or more embodiments of the invention, for the addition of new routes in a network device. In Step 308, the network device receives instructions to add a new route or multiple new routes to the set of routes programmed into the hardware of the FIB. The instructions to add a new route may be received as a route update from a peer network device, or may be provided by a network administrator.

In Step 310, the route to be added to the FIB is added to the routing information base (RIB).

In Step 312, if the network device OS and/or the routing protocol used by the network device selects the route that was added to the RIB in Step 310 as a route to be made available for routing, the network device OS, without delay (or with only minimal delay), writes the route into the FIB.

In Step 314, the network device, without delay, notifies the peer network devices about the newly available route. In the network (100) shown in FIG. 1, for example, if a route is was added to the FIB of leaf network device A (108A), leaf network device A (108A), being connected to leaf network devices B and C (108B, 108C) and to border leaf network device (110), via spine network devices A and B (114A, 114B), may communicate the route addition to the spine network devices A and B (114A, 114B), from where the route addition information may be relayed to leaf network devices B and C, and to border leaf network device (110). In one or more embodiments of the invention, the network device may use the border gateway protocol (BGP) to communicate with the peer network devices. Accordingly, the network device may send a BGP "UPDATE" message that specifies the route that was added in Step 312 to the peer network devices.

In Step 316, the network device processes a packet that requires the newly added route, i.e., it sends the packet to the next hop network device specified by the new route.

FIG. 4 shows a method for communicating a pending route withdrawal to peer network devices, and subsequently withdrawing the route.

Turning to FIG. 4, in Step 400, the route to be withdrawn is removed from the routing information base (RIB).

In Step 402, the network device notifies the peer network devices about the route to be withdrawn. In the network (100) shown in FIG. 1, for example, if a route is scheduled to be withdrawn from the FIB of leaf network device A (108A), leaf network device A (108A), being connected to leaf network devices B and C (108B, 108C) and to border leaf network device (110), via spine network devices A and B (114A, 114B), may communicate the route withdrawal to the spine network devices A and B (114A, 114B), from where the route withdrawal information may be relayed to leaf network devices B and C, and to border leaf network device (110), as previously described. If the network device uses BGP to communicate with the peer network devices, the network device may send a BGP "UPDATE" message that contains route withdrawal information identifying the route to be withdrawn to the peer network devices.

In Step 404, a timer is initialized and started. The timer is used to delay the removal of the route from the forwarding information base (FIB) while route withdrawal notifications are sent to the peer network devices. The time required until the route withdrawal notifications have propagated to all network devices may vary depending on the number of peer network devices, the topology, the complexity of the network, etc. The route withdrawal information may propagate through a network with a limited number of peer network devices within limited time, whereas significantly more time may be necessary in a network that includes many peer network devices and/or that has a complex topology. Accordingly, the time required until the route withdrawal notifications have propagated to all network devices may increase with the number of network devices, and may be proportional to the number of network devices in the network. These factors therefore influence the configuration of the timer. The timer may therefore be freely configurable, and a network administrator may initialize the timer with a timeout value that provides sufficient time to notify the peer network devices (i.e., a peer network device notification time plus a buffer time that provides a safety margin), while avoiding an excessively delayed update of the FIB. The timeout value may be determined experimentally, for example, by repeatedly executing the method for withdrawing programmed routes as described in FIGS. 3 and 4, systematically varying the timeout value, and measuring the resulting packet drop. Initially a short timeout value may be selected, resulting in a large number of packets being dropped because the route is withdrawn from the FIB before all peer network devices have been notified about the pending route withdrawal. In the next iteration, the timeout value is increased, the method is executed, and the packet drop is measured again. Due to the shortened time window from route withdrawal to successful notification of all peer network devices, fewer packets may be dropped. The cycle of increasing the timeout value and executing the method may be repeated until no more dropped packets are detected. The absence of dropped packets indicates that the timeout delay is sufficiently long to allow notification of all peer network devices before the route is withdrawn from the FIB. Alternatively, the timeout value may be set to a default value sufficiently long to avoid packet drops without experimentation.

In Step 406, a determination is made about whether the timer has expired. The method may only proceed to Step 408 if the timer has expired. In Step 408, the network device may update the routes stored in the FIB based on the routes stored in the RIB by withdrawing the route to be withdrawn from the FIB. In one or more embodiments of the invention, only the withdrawal of routes from the FIB may be delayed by the timer, whereas the writing of newly available routes into the FIB may be performed without delay.

Figure 5:
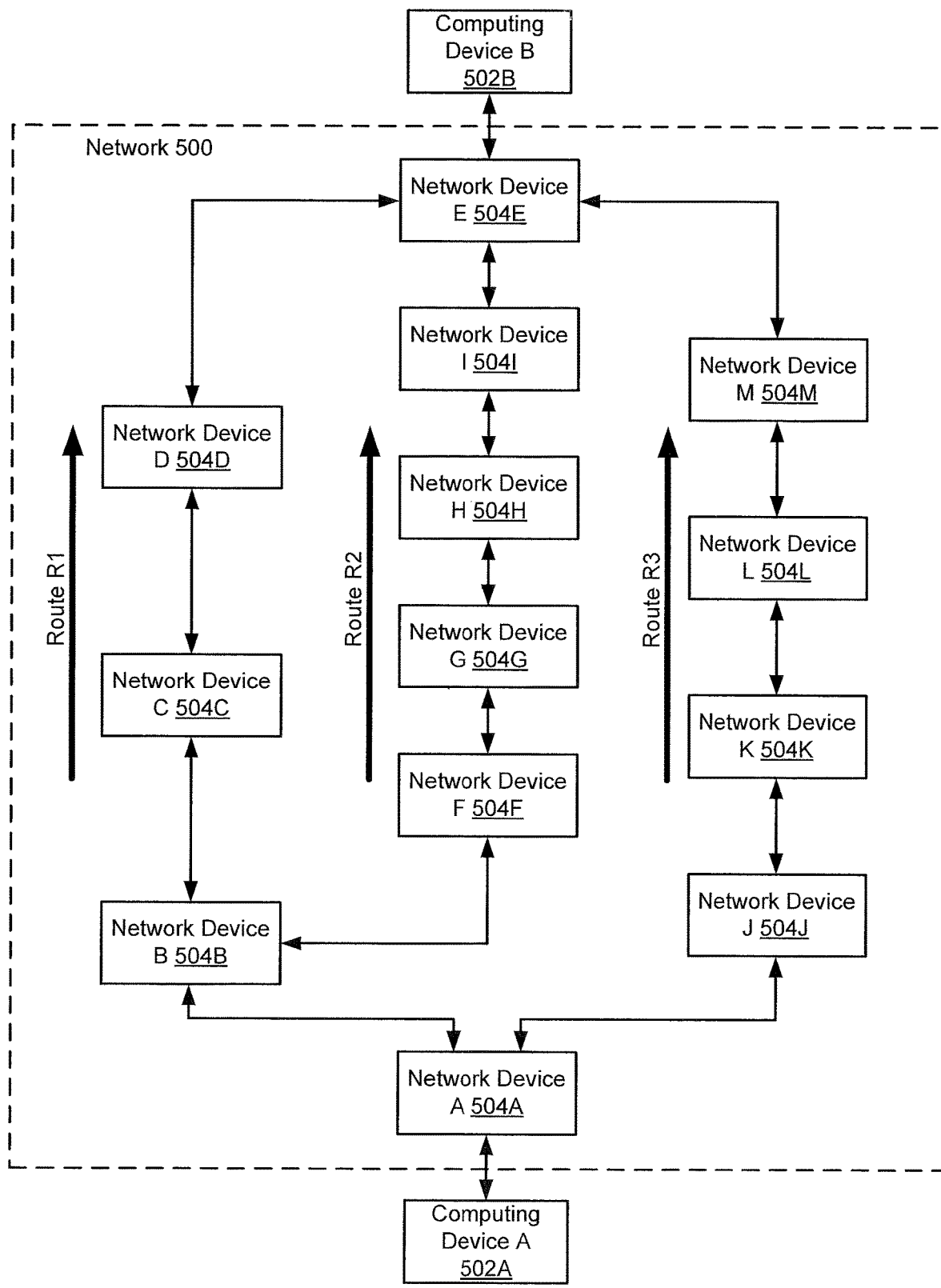
FIG. 5 shows a network including network devices in accordance with one or more embodiments of the invention.

FIG. 5 shows a network (500) that connects computing devices A and B (502A, 502B). The network (500) includes network devices (504A-504M), in accordance with one or more embodiments of the invention. Network devices (504A-504M) are interconnected and provide three partially redundant connections between computing devices A and B (502A, 502B). Network (500) may be part of a larger network that connects additional computing devices (not shown) via additional network devices (not shown). In the scenario described in FIG. 5, computing device A (502A) continuously sends packets to computing device B (502B). Three partially redundant routes, R1-R3, are available for packets to be transported from computing device A (502A) to computing device B (502B). Route R1 includes network devices A, B, C, D, and E (504A-504E). Route R2 includes network devices A, B, F, G, H, I, and E (504A, 504B, 504F-504I, and 504E). Route R3 includes network devices A, J, K, L, M and E (504A, 504J-504M, and 504E). Route R1 therefore consists of 5 hops (i.e., intermediate network devices), route R2 consists of 7 hops, and route R3 consists of 6 hops. All network devices use the border gateway protocol (BGP) to exchange information about available routes and are therefore aware of all three routes available. Because route R1 is the route with the fewest hops between network devices A and B (502A, 502B), it is the most direct route and therefore is the default route used. Accordingly, network device A (504A) sends packets received from computing device A (502A) to network device B (504B) rather than sending the packets to network device J (504J). Network device B (504B) sends the packets received from network device A (504A) to network device C (504C) rather than sending the packets to network device F (504F). Routes R2 and R3 may, however, be used if route R1 becomes unavailable.

The use case scenarios described below are intended to provide examples of the method for withdrawing routes in programmed network devices, described in FIGS. 3-4. The use case scenarios are based on the sample network shown in FIG. 5 and are for illustrative purposes only. The method described by FIGS. 3-4 is not limited to the network topology shown in FIG. 5, but rather is universally applicable to a wide range of networks of different topology, complexity and size.

Example Use Case 1

Consider a scenario in which a system administrator intends to replace network device D (504D). During the replacement, network device C (504C) cannot send packets to network device D (504D), and route R1 is therefore unavailable. Accordingly, in order to avoid dropped packets, before shutting down and removing network device D (504D) from the network (500), the network administrator sends a command to network device C (504C), instructing network device C (504C) to withdraw route R1 (FIG. 3, Step 300). Network device C (504C) withdraws the route from the RIB (Step 400) and sends a BGP UPDATE message to the adjacent peer network devices, i.e., network device B and D (504B, 504D) (FIG. 4, Step 402). Network device C (504C), however, does not withdraw route R1 from the FIB until the timer (Step 406) has expired.

During the execution of the steps described above, computing device A (502A) keeps sending packets to computing device B (502B) via route R1. When network device B (504B) receives the notification about the pending route withdrawal, sent by network device C (504C) in Step 402, network device B (504B) stops directing packets to network device C (504C). Because route R2 is an alternative to route R1 for packets directed to computing device B, network device B begins to redirect the packets to network device F. Even though route R2 includes 7 hops and is therefore less direct than route R1 that includes 5 hops, all packets are therefore successfully delivered to computing device B. No packets are dropped.

In addition, network device B propagates the route withdrawal notification to adjacent network devices, i.e., network devices A (504A) and F (504F). Accordingly, network device A (504A) removes route R1 from the set of routes it considers for routing packets from computing device A (502A) to computing device B (502B). Because route R3 is more direct than route R2 (i.e., having fewer hops), network device A (502A) stops sending packets to network device B (502B), even though route R2 is still available, and instead directs the packets to network device J (504J). No packets are dropped.

The route withdrawal notification is eventually propagated to all network devices in the network (500), and therefore all network devices are notified that route R1 is unavailable.

Returning to network device C, after the timer expires (FIG. 4, Step 406), network device C withdraws route R1 from the FIB (Step 408) By the time the route is withdrawn from the FIB, all network devices have been notified of the pending route withdrawal, and therefore have stopped directing packets to network device C (504C). Subsequently, the network administrator may remove and replace network device D (504D). No packets are dropped at any time.

In order to guarantee that all network devices have received the pending route withdrawal information before route R1 is withdrawn from network device C (504C), the timeout value of the timer (Step 406) needs to be configured appropriately. Determining an appropriate timeout value may have been performed as part of the initial configuration of the network, as described below.

Example Use Case 2

After the network administrator has replaced network device (504D), the network administrator sends a command to network device C (504C) instructing network device C (504C) to add route 1 (FIG. 3, Step 308). Network device C (504C), without delay, adds the route to the RIB and the FIB and sends a BGP UPDATE message to the adjacent peer network devices B and D (504B, 504D) to add route 1 (Steps 310-314). Network device C (504C) is ready to accept packets that are directed to network device D (504D). As the route update information propagates through the network (500), network devices B (504B) and subsequently network device A (504A) become aware of the availability of route 1. With the availability of route 1, network device A (504A) stops sending packets to network device J (504J) and instead directs the packets to network device B (504B) because route R1 is more direct than route R3. Correspondingly, network device B (504B) directs packets to network device C (504C) rather than sending the packets to network device F (504F) because route R1 is more direct than route R2. All network devices immediately add the new route to the FIB, and therefore adjust their routing decisions without delay.

Example Use Case—Timeout Value Configuration

The following steps may have been performed during the initial setup of the network (500). As previously noted, the network (500) may include many computing devices and network devices, in addition to the computing devices and network devices shown in FIG. 5. To determine a realistic timeout value, the network administrator configures computing devices that are connected to the network to continuously exchange data streams that rely on the routes to be withdrawn. Next, the network administrator issues a command to withdraw the routes, and in response the network device immediately withdraws the routes from the FIB. Further, the network device communicates the route withdrawal to the peer network devices. Because the peer network devices have not yet received the route withdrawal notification, the peer network devices keep directing packets that require the withdrawn routes to the network device. As a result, the network device drops these packets. Over time, an increasing number of peer network devices receives the route withdrawal notification, and accordingly stop directing packets to the network device. The network administrator records the time that expires until no more packets are being dropped. The time when no more packets are being dropped corresponds to the time when all peer network devices have received the route withdrawal notification and therefore have stopped directing packets that require the routes to be withdrawn to the network device. The network administrator may use this recorded time to configure the timeout value. Subsequently, the network administrator may repeat these measurements in order to test whether the timeout value is reproducible.

In the scenario described below, assume that the network administrator intends to determine realistic timeout values for the entire network (500) that includes many network devices and computing devices, in addition to the network devices and the computing devices shown in FIG. 5. The network administrator decides to withdraw 10,000 IPv4 routes and 10,000 IPv6 routes. The network administrator configures one stream of test data for each route to be withdrawn, i.e. the network administrator sets up a total of 20,000 streams, each of the streams requiring the availability of one of the routes to be withdrawn. Each stream is being sent continuously from one computing device to another computing device, using one of the routes to be withdrawn. The total resulting flow rate is 28.5 Gbit/sec, distributed evenly across the 20,000 streams. When the network administrator issues the command to withdraw the 20,000 routes, the routes are immediately withdrawn from the FIB of the network device (timeout value set to zero). The resulting packet losses are recorded over time, separately for each of the 20,000 streams, until no more dropped packet are detected for any of the 20,000 streams. The network administrator examines worst case and average results. The worst case result identifies the stream with the longest duration of dropped packets observed, whereas the average result summarizes the average duration of dropped packets observed across all 20,000 streams. Having performed the measurements for the first time, the network administrator determines that, on average, the last dropped packet is observed after 232.581 ms, whereas packets are being dropped until after 495.149 ms for the worst case stream. Accordingly, the network administrator may decide to set the timeout value to 500 ms.

Next, the network administrator repeats the measurements described above and obtains an average value of 448.177 ms and a worst case value of 613.359 ms. The network administrator may therefore decide to increase the timeout value to, for example, 700 ms. Due to the significant differences between the results obtained from the first and the second measurement, the network administrator however decides to add a large safety margin to the timeout value, and therefore sets the timeout value to 2 or 3 seconds, for example. After implementing and activating the method shown in FIGS. 3 and 4, using a 2 or 3 second timeout value, the network administrator monitors dropped packets as a result of withdrawing routes from the FIB of the network device, and finds that no packets are being dropped.

Embodiments of the invention may enable a network device to stop offering routing services for a route to be withdrawn without dropping packets when the route is withdrawn from the routes stored in the hardware of the network device. A route may be withdrawn from the routes stored in the hardware of the network device with the minimum delay necessary to notify peer network devices about the pending route withdrawal, whereas new routes may be added to the routes stored in the hardware of the network device without a delay. Accordingly, network devices in accordance with one or more embodiments of the invention may perform updates to the routing hardware at the earliest possible instant, while avoiding dropping packets, thereby maintaining an up-to-date set of routes in the hardware of the network device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for withdrawing programmed routes in network devices, comprising:
   receiving instructions to withdraw a route of a plurality of programmed routes stored in a forwarding information base (FIB) of a network device;
   removing the route from a plurality of routes stored in a routing information base (RIB) of the network device in response to receiving the instructions;
   notifying, after removing the route from the RIB, a peer network device of a plurality of peer network devices in a network about the route to be withdrawn;
   initializing a timer with a timeout value and starting the timer on the network device, wherein the timeout value is based, at least in part, on a set of network conditions within the network comprising the plurality of peer network devices, the network conditions comprising a previously determined time required to perform the notifying of each of the plurality of peer network devices about the route to be withdrawn;
   before the timer expires, processing a packet that uses the route to be withdrawn;
   after the timer expires, removing the route from the FIB; and
   after removing the route from the FIB, processing, by the network device, a second packet using a second route of the plurality of programmed routes in the FIB, wherein the second route is also stored in the RIB.

2. The method of claim 1, wherein removing the route from the FIB comprises updating the plurality of programmed routes stored in the FIB based on the plurality of routes stored in the RIB.

3. The method of claim 1, wherein the timeout value is determined using a peer network device notification time and a buffer time.

4. The method of claim 3, wherein a magnitude of the timeout value is related to a cardinality of the plurality of peer network devices.

5. The method of claim 1 further comprising:
   receiving instructions to add new route to the FIB;
   adding the new route to the RIB; and
   adding, without delay, the new route to the FIB.

6. The method of claim 1, wherein processing the packet that uses the route to be withdrawn comprises:
   receiving the packet from a second peer network device;
   determining a destination address of the packet, based on header information of the packet;
   determining, by searching the plurality of programmed routes stored in the FIB using the destination address, that the route to be withdrawn is to be used to send the packet; and
   sending the packet to a next hop network device specified by the route to be withdrawn.

7. A network device comprising:
   a forwarding information base (FIB);
   a routing information base (RIB); and
   a timer, wherein the network device is configured to:
      receive instructions to withdraw a route of a plurality of programmed routes stored in the FIB;
      remove the route from a plurality of routes stored in the RIB based on the instructions in response to receiving the instructions;
      notify, after removing the route from the RIB, a peer network device of a plurality of peer network devices in a network about the route to be withdrawn;
      initialize a timer with a timeout value and start the timer, wherein the timeout value is based, at least in part, on a set of network conditions within the network comprising the plurality of peer network devices, the network conditions comprising a previously determined time required to perform the notifying of each of the plurality of peer network devices about the route to be withdrawn;
      before the timer expires, process a packet that uses the route;
      after the timer expires, remove the route from the FIB; and
      after the route is removed from the FIB, process a second packet using a second route of the plurality of programmed routes in the FIB, wherein the second route is also stored in the RIB.

8. The network device of claim 7, wherein the network device is further configured to remove the route from the FIB by updating the plurality of programmed routes stored in the FIB based on the plurality of routes stored in the RIB.

9. The network device of claim 7, wherein the timeout value is determined using a peer network device notification time and a buffer time.

10. The network device of claim 9, wherein a magnitude of the timeout value is related to a cardinality of the plurality of peer network devices.

11. The network device of claim 7, wherein, to process the packet that uses the route to be withdrawn, the network device is further configured to:
   receive the packet from a second peer network device;
   determine a destination address of the packet, based on header information of the packet;
   determine, by searching the plurality of programmed routes stored in the FIB using the destination address, that the route to be withdrawn is to be used to send the packet; and send the packet to a next hop network device specified by the route to be withdrawn.

12. The network device of claim 7, wherein the network device comprises a router or a multilayer switch.

13. A non-transitory computer readable medium comprising instructions that, when executed by a processor, enable a network device to:
  receive instructions to withdraw a route of a plurality of programmed routes stored in a forwarding information base (FIB) of the network device;
  remove the route from a plurality of routes stored in a routing information base (RIB) of the network device in response to receiving the instructions;
  notify, after removing the route from the RIB, peer network device of a plurality of peer network devices in a network about the route to be withdrawn;
  initialize a timer with a timeout value and start the timer on the network device, wherein the timeout value is based, at least in part, on a set of network conditions within the network comprising the plurality of peer network devices, the network conditions comprising a previously determined time required to perform the notifying of each of the plurality of peer network devices about the route to be withdrawn;
  before the timer expires, process a packet that uses the route to be withdrawn; and
  after the timer expires, remove the route from the FIB; and
  after the route is removed from the FIB, process a second packet using a second route of the plurality of programmed routes in the FIB, wherein the second route is also stored in the RIB.

14. The non-transitory computer readable medium of claim 13, wherein the instructions that enable the network device to remove the route from the FIB comprise instructions to update the plurality of programmed routes stored in the FIB based on the plurality of routes stored in the RIB.

15. The non-transitory computer readable medium of claim 13, wherein the timeout value is determined using a peer network device notification time and a buffer time.

16. The non-transitory computer readable medium of claim 15, wherein a magnitude of the timeout value is related to a cardinality of the plurality of peer network devices.

17. The non-transitory computer readable medium of claim 13, wherein the instructions that enable the network device to process the packet that uses the route to be withdrawn comprise instructions to:
  receive the packet from a second peer network device;
  determine a destination address of the packet, based on header information of the packet;
  determine, by searching the plurality of programmed routes stored in the FIB using the destination address, that the route to be withdrawn is to be used to send the packet; and
  send the packet to a next hop network device specified by the route to be withdrawn.

* * * * *